United States Patent
Biberstein et al.

(10) Patent No.: US 8,340,942 B2
(45) Date of Patent: Dec. 25, 2012

(54) IDENTIFYING OPPORTUNITIES TO IMPROVE MULTIPROCESS SYSTEM PERFORMANCE

(75) Inventors: Marina Biberstein, Haifa (IL); Andre Heilper, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/766,949

(22) Filed: Apr. 26, 2010

(65) Prior Publication Data

US 2011/0264410 A1 Oct. 27, 2011

(51) Int. Cl.
G06F 15/00 (2006.01)

(52) U.S. Cl. ......... 702/186; 702/189; 706/11; 705/7.38; 705/7.36; 705/35; 707/999.002; 707/E17.005; 700/121; 700/28; 711/170; 711/150

(58) Field of Classification Search ................. 702/186, 702/189; 707/999.002, E17.005; 340/539.12, 340/573.1; 706/11, 50; 705/2, 7.38, 36 R, 705/348, 7.36, 35; 703/2; 700/121, 28; 717/130; 711/213, 170, 150; 713/322
See application file for complete search history.

(56) References Cited

U.S. PATENT DOCUMENTS

| | | | |
|---|---|---|---|
| 5,259,066 A | 11/1993 | Schmidt | |
| 5,442,730 A | 8/1995 | Bigus | |
| 5,590,326 A * | 12/1996 | Manabe | 711/150 |
| 5,966,537 A * | 10/1999 | Ravichandran | 717/158 |
| 6,401,240 B1 * | 6/2002 | Summers | 717/130 |
| 6,519,766 B1 * | 2/2003 | Barritz et al. | 717/130 |
| 6,539,464 B1 * | 3/2003 | Getov | 711/170 |
| 7,379,846 B1 | 5/2008 | Williams et al. | |
| 7,584,117 B2 * | 9/2009 | Bubner | 705/7.36 |
| 7,701,353 B1 * | 4/2010 | Moreno | 340/573.3 |
| 7,941,805 B2 * | 5/2011 | Dillenberger et al. | 718/105 |
| 8,108,875 B2 * | 1/2012 | Dillenberger et al. | 718/104 |
| 8,191,049 B2 * | 5/2012 | Levine et al. | 717/127 |
| 2003/0163357 A1 * | 8/2003 | Engleman et al. | 705/7 |
| 2007/0150893 A1 * | 6/2007 | Grobman | 718/1 |
| 2008/0046895 A1 * | 2/2008 | Dillenberger et al. | 718/105 |
| 2008/0178192 A1 * | 7/2008 | Dillenberger et al. | 718/105 |
| 2010/0205119 A1 * | 8/2010 | Moreno | 706/11 |
| 2011/0078702 A1 * | 3/2011 | Hosoki | 718/108 |
| 2012/0022832 A1 * | 1/2012 | Shannon et al. | 702/189 |

OTHER PUBLICATIONS

U.S. Appl. No. 61/257,019.*

* cited by examiner

*Primary Examiner* — Carol S. Tsai
(74) *Attorney, Agent, or Firm* — Ziv Glazberg; G&A Glazberg Applbaum (57) ABSTRACT

Expert system may utilize multiple metrics to estimate whether a performance improvement activity has a potential to improve performance in respect to a predetermined performance metric. The multiple metrics may be propagated based on whether or not they may be affected by the activity and based on an associated value that may take into account the current value of the metric. An Index Propagation Graph may be further utilized to represent a propagation function which may propagate the potential of improvement of each metric in respect to the predetermined performance metric.

20 Claims, 4 Drawing Sheets

IDENTIFYING OPPORTUNITIES TO IMPROVE MULTIPROCESS SYSTEM PERFORMANCE

BACKGROUND

The present disclosure relates to performance optimizations of computer programs in general, and to expert systems for identifying opportunities to improved performance in a multiprocessor system in particular.

One of the main challenges of the multi-processor systems today is to achieve the implied increase in performance. However, for different reasons applications fail to perform at the expected speed. Therefore a myriad of performance tools, also referred to as profiling tools, are used to detect what causes the slowdown in parallel processing of a target system. Sometimes these tools are utilized together by an expert system where a set of strict rules will point finally to a bottleneck. Unfortunately the weak point of such expert systems is that the interrogation of the performance of each element consists of comparing its value to some predetermined threshold.

The threshold can be difficult to determine and may vary depending on system characteristics. For example, idleness of 20% may be acceptable throughput in a server, while idleness below 80% may be unacceptable in a client. In addition, thresholds are discrete while performance is continuous. Utilization level of 79% percent is not much different than 81%. Therefore, when determining a predetermined discrete threshold choosing a discrete value as the threshold may be problematic and inaccurate.

In many cases, there are multiple problems present in a target system and many possible Performance Improvement (PI) activities may be performed that are likely to improve performance. Some of the problems may be pronounced in some performance metrics and not in other. Determining in which PI activity the programmer should invest his time, may be hard when simple discrete thresholds are utilized separately for each metric.

BRIEF SUMMARY OF THE INVENTION

One exemplary embodiment of the disclosed subject matter is a computer-implemented method for determining an index of a potential of Performance Improvement (PI) in a computerized system by utilizing a PI activity, the method comprising: receiving a plurality of values of a plurality of performance metrics of the computerized system, the plurality of performance metrics comprises at least a performance index metric; determining a first portion of the plurality of performance metrics, each metric of the first portion has a potential of PI in response to performing the PI activity; calculating the index of the potential of PI based on at least the plurality of values of metrics associated with the first portion, wherein the index is calculated in respect to the performance index metric; and outputting an indication of the index of the potential of PI.

Another exemplary embodiment of the disclosed subject matter is a computerized apparatus for determining an index of a potential of PI in a computerized system by utilizing a PI activity, the computerized apparatus having a processor, the computerized apparatus comprising: a receiver configured to receive a plurality of values of a plurality of performance metrics of the computerized system, the plurality of performance metrics comprises at least a performance index metric; an index calculator configured to calculate the index of the potential of improvement in respect to the performance index metric, the index calculator comprising: a potentially improved metric determinator configured to determine a first portion of the plurality of performance metrics, each metric of the first portion has a potential of improvement in response to the PI activity; and an output module configured to output an indication of the index of the potential of PI.

Yet another exemplary embodiment of the disclosed subject matter is a computer program product for determining an index of a potential of Performance Improvement (PI) in a computerized system by utilizing a PI activity, the product comprising: a computer readable medium; a first program instruction for receiving a plurality of values of a plurality of performance metrics of the computerized system, the plurality of performance metrics comprises at least a performance index metric; a second program instruction for determining a first portion of the plurality of performance metrics, each metric of the first portion has a potential of PI in response to performing the PI activity; a third program instruction for calculating the index of the potential of PI based on at least the plurality of values of metrics associated with the first portion, wherein the index is calculated in respect to the performance index metric; and a fourth program instruction for outputting an indication of the index of the potential of PI; wherein the first, second, third, and fourth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to detect optimization opportunities based on a values of multiple performance metrics, such as CPU idleness, Cycles Per Instruction (CPI), Threads per CPU, and the like. Another technical problem dealt with by the disclosed subject matter is to provide assistance to a developer to determine in which PI activity the developer should invest time in. Yet another technical problem dealt with by the disclosed subject matter is to provide for an expert system to assist a developer in analyzing performance of a target system.

One technical solution is to calculate an index of potential PI improvement based on various performance metrics for a PI activity. The index of potential PI improvement may be calculated based on multiple metrics. In some exemplary embodiments, some of the metrics are known to have a potential of being affected by the PI activity (hereinafter: affected metrics), while other metrics are known to not have a potential of being affected by the PI activity (hereinafter: non-affected metrics). The calculation may be performed based on the affected metrics. The calculation may further take into account the current value of the non-affected metrics. Another technical solution is to provide a data structure representing functions to calculate the index in respect to various PI activities. The data structure may be an Index Propagation Graph (IPG). Potential of improvement of a metric, represented by a node of the IPG, may be estimated based on current value of the metric and whether the metric is an affected metric or a non-affected metric. The index may be calculated by propagating potential of improvement of various metrics in respect to a performance index metric. Various performance index metrics may be used, such as for example parallelism, cost, throughput, latency and machine utilization.

One technical effect of utilizing the disclosed subject matter is to enable a generalization of a discrete decision tree. Another technical effect is to enable non-experts to understand performance issues on complex computerized systems, such as multi-core architectures. Yet another technical effect is to enable experts to provide initial analysis of metrics and PI activities on different architectures and to utilize the initial analysis in an automated manner by non-experts. Yet another technical effect is to enable an expert system that does not utilize discrete thresholds. Yet another technical effect is to avoid utilization of discrete thresholds. The disclosed subject matter enables the user to assess in which PI activity he should invest his efforts. The user may take into account a variety of factors, such as expected gain, ease of change (e.g., administrator may only consider changes that he is able to control through program configuration, while a developer would consider all of them), and expected usage patterns.

Figure 1:
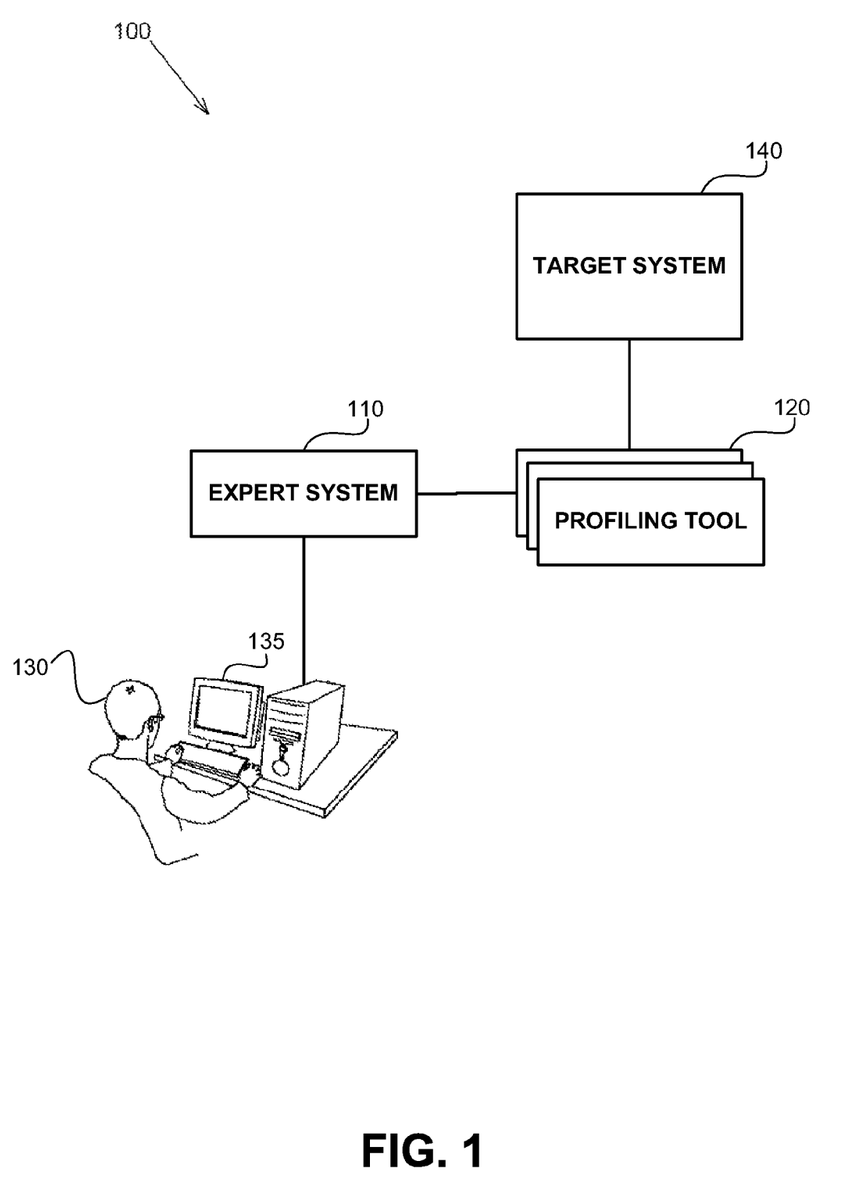
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 may comprise an expert system 110. The expert system 110 may be utilized to analyze performance of a target system 140, such as a server, a client, a multi-core computer, a multi processor computer or the like.

One or more profiling tools 120 may be utilized to determine values of performance metrics of the target system. Some exemplary profiling tools may be for example "sar" Unix command, "ps" Unix command, a system profiler, such as OProfile for Linux systems, or the like.

The expert system 110 may utilize values of performance metrics to determine a potential of PI in a PI activity. The expert system 110 may provide an index indicative of a usefulness of performing a PI activity. A user 130, such as a programmer, may utilize a Man-Machine Interface 135 to view the indices determined by the expert system 110. The user 130 may determine to perform a PI activity based on the index provided by the expert system 110. The expert system 110 may suggest to perform one or more PI activities based on an absolute value of an index of a PI activity, a relative value in respect to other PI activities, a combination thereof and the like.

In some exemplary embodiments, the user 130 may be a non-expert having no specific expertise and/or understanding in profiling. The user 130 may be novice in the performance analysis field. An expert (not shown) may provide the expert system 110 with input such as to determine which PI activities are affected by a metric in a target system of a predetermined configuration. The input may be a function for calculating a back-of-the-envelope estimation of potential of improvement in a metric by a PI activity. The input may be a function for propagating an estimation of performance if the metric is a non-affected metric in respect to a PI activity.

Figure 2:
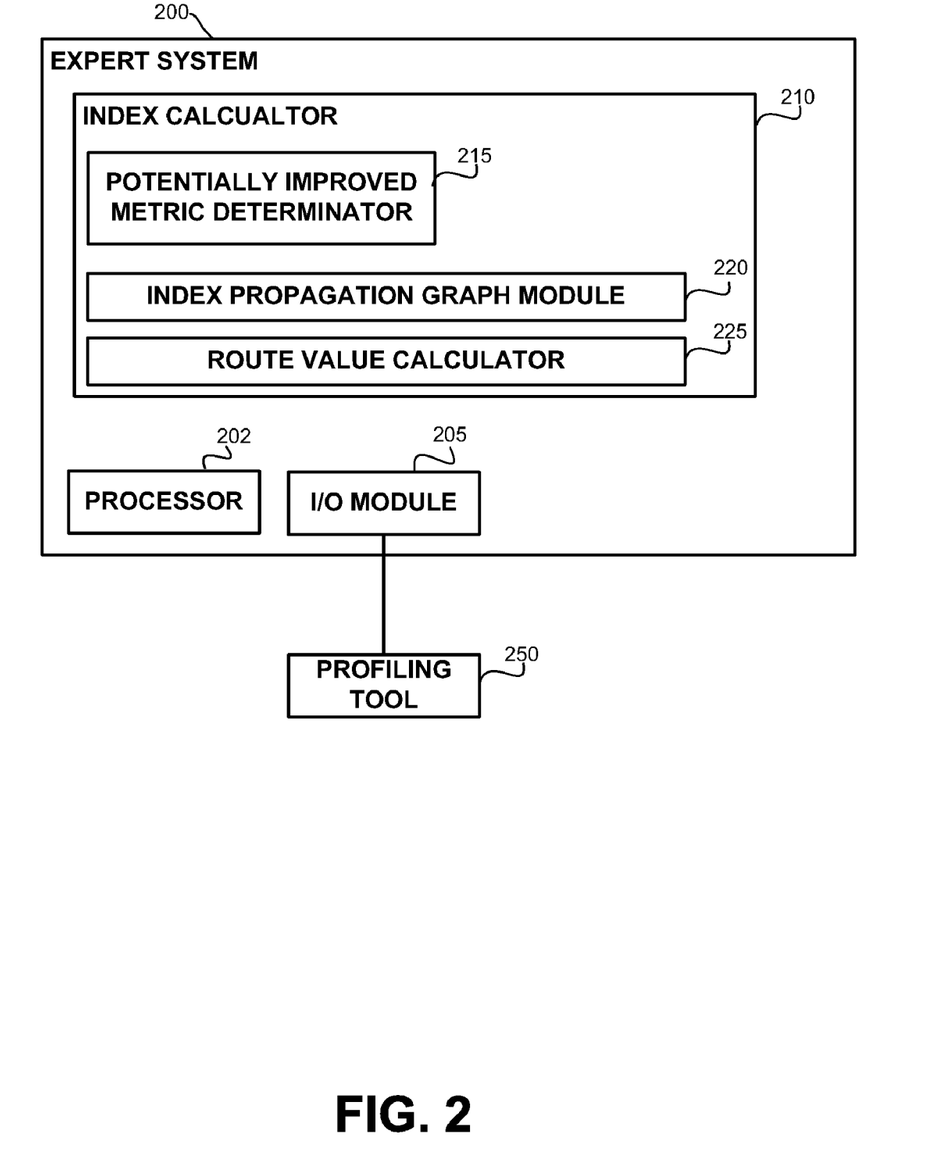
FIG. 2 shows a block diagram of an optimization tool, in accordance with some exemplary embodiments of the disclosed subject matter.

Referring now to FIG. 2 showing an expert system in accordance with some exemplary embodiments of the disclosed subject matter. An expert system 200, such as 110 of FIG. 1, may be configured to determine an index of a potential of PI in a target system, such as 140 of FIG. 1, in response to performing a PI activity. The index may be measured in respect to a performance index metric.

In some exemplary embodiments, the expert system 200 may comprise an index calculator 210. The index calculator 210 may be configured to calculate the index of the potential of PI in respect to the performance index metric. The index calculator 210 may be utilized in respect to various PI activities to provide for multiple index values, associated with each PI activity.

A potentially improved metric determinator 215 may determine if a metric is an affected metric or a non-affected metric in respect to a PI activity. The determination may be performed based on a database (not shown) which may be updated, initialized, maintained or the like by expert in the field of performance analysis or by similar personnel.

Figure 4:
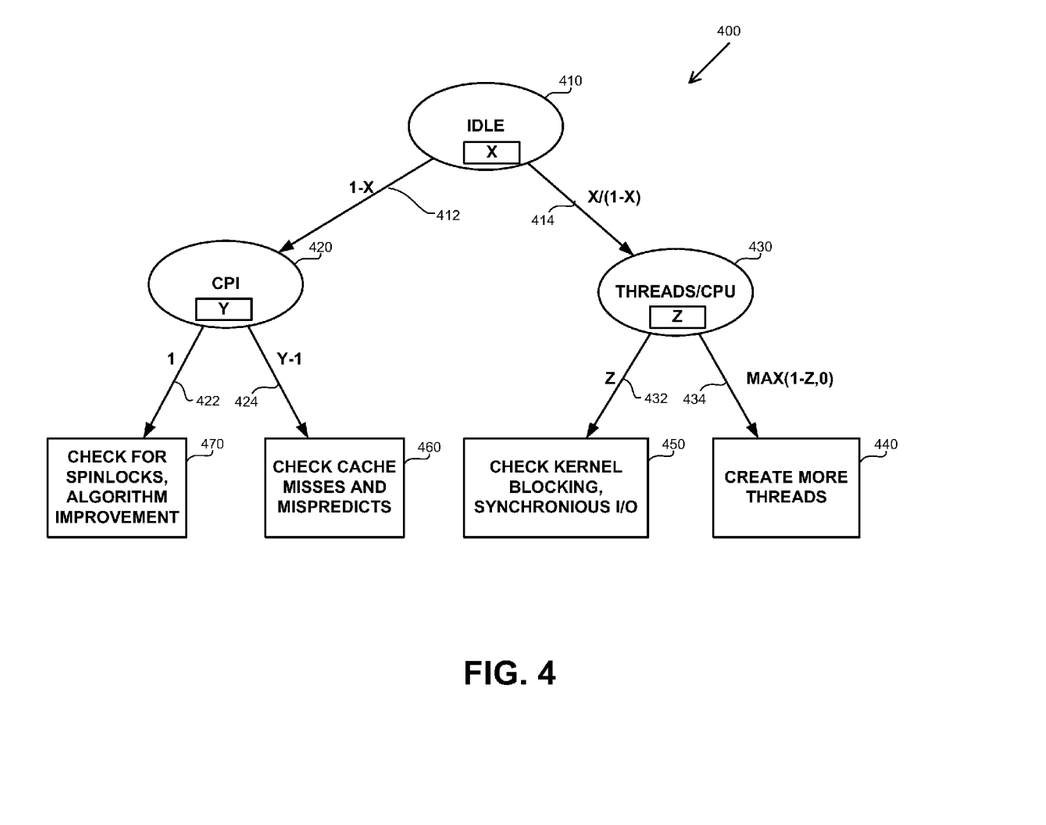
FIG. 4 shows a diagram of an index propagation graph in respect to a throughput metric, in accordance with some exemplary embodiments of the disclosed subject matter.

In some exemplary embodiments, the index calculator 210 may comprise an index propagation graph module 220. The index propagation graph module 220 may be utilized to retain an IPG. The IPG may represent propagation functions of metrics in respect to a performance index metric. The propagation functions may be utilized to calculate an estimation of potential of PI based on a PI activity. The IPG may comprise routes of nodes representing metric that may be utilized to calculate the potential of PI based on the PI activity. An exemplary IPG is shown in FIG. 4. The IPG may be predeterminedly defined, such as for example by an expert, and retained in a storage system.

A route value calculator 225 may be utilized to calculate a value of the index of the potential of PI based on a route in the IPG. The route value calculator 225 may be utilized to calculate an index value of a PI activity based on a route from the root of the IPG to the leaf representing the PI activity.

In some exemplary embodiments of the disclosed subject matter, the expert system 200 may comprise an Input/Output (I/O) module 205. The I/O module 205 may be utilized to receive, retrieve or otherwise obtain values of a metric, such as for example from a profiling tool 250, such as 120 of FIG. 1. The I/O module 205 may be utilized to provide an output to a user, such as 130 of FIG. 1. The output may comprise indications of the calculated potential of PI associated with a PI activity. The output may be a suggestion which PI activity to perform. In some exemplary embodiments, the expert system 200 may calculate an index associated with a PI activity, based on an input from the user. For example, the user may provide an input indicating which PI activities may be performed and the expert system 200 may provide an output useful for determining which of the PI activities, if any, is likely to improve performance of the target system. In some exemplary embodiments, the suggestion may indicate PI activities that are likely to substantially improve the performance. The I/O module 205 may be a software component, such as an Application Programming Interface (API), a socket or the like, a hardware component, such as a modem, a transceiver, or the like, a combination thereof or the like.

In some exemplary embodiments, the expert system 200 may comprise a processor 202. The processor 202 may be a Central Processing Unit (CPU), a microprocessor, an electronic circuit, an Integrated Circuit (IC) or the like. The processor 202 may be utilized to perform computations required by the expert system 200 or any of it subcomponents.

Figure 3:
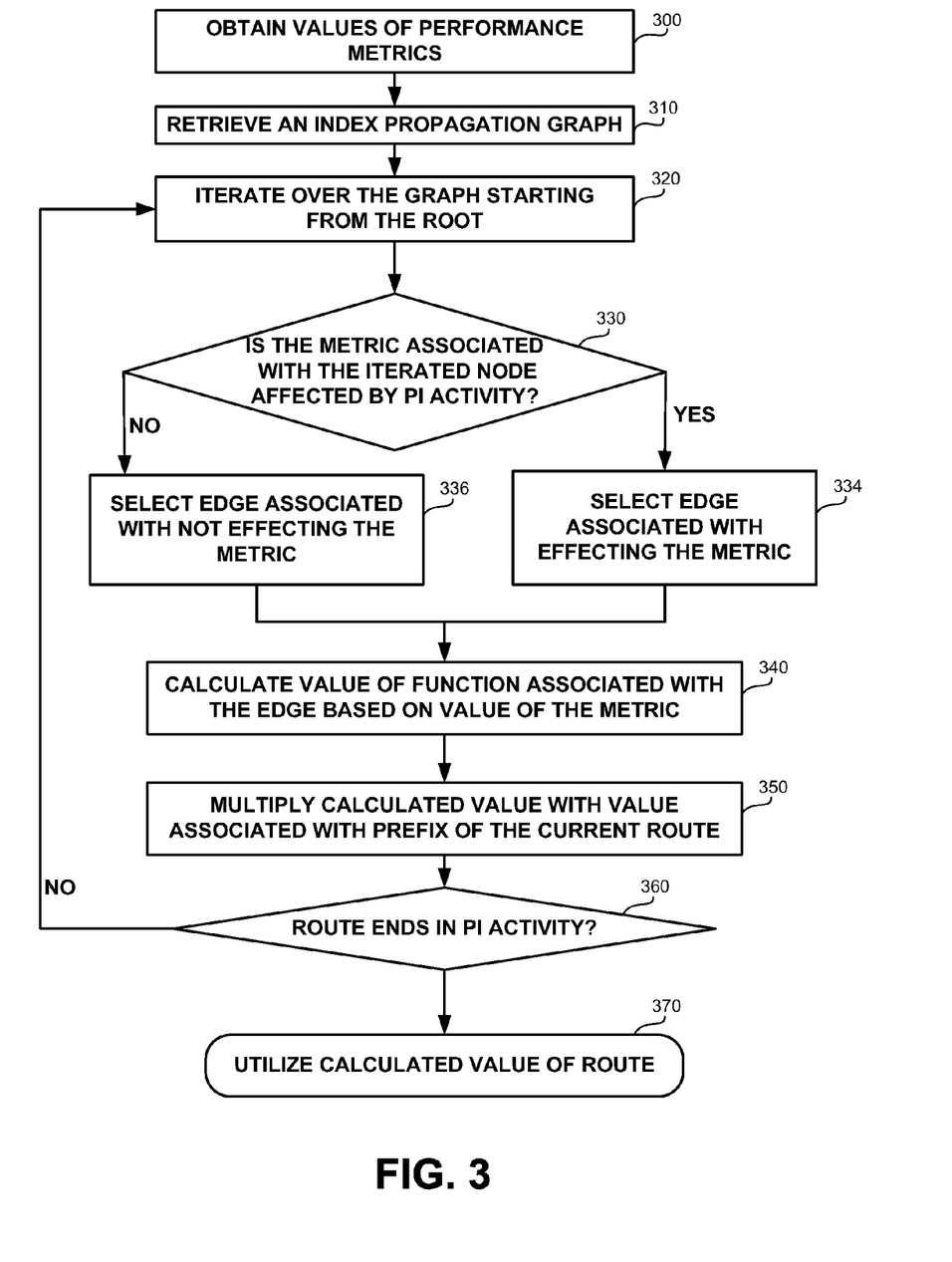
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, values of performance metrics may be obtained. Step 300 may be performed by a receiver, such as comprised by I/O module 205 of FIG. 2. The values may be obtained from profiling tools, such as 120 of FIG. 1.

In step 310, an IPG may be obtained. The IPG may be obtained using an IPG module, such as 220 of FIG. 2. The IPG may be obtained from a user, such as 130 of FIG. 1 or an expert, using an I/O module, such as 205 of FIG. 2. The IPG may be predetermindly obtained and retained in a storage system, such as a database.

In step 320 an iteration process of the IPG may being. The iteration may be performed in respect to a route of the IPG associated with a PI activity. The iteration may begin in a node defined as the root of the IPG. In each iteration steps 330-360 may be performed. In some exemplary embodiments, alternative methods may be employed to calculate the values associated with PI activities, such as by calculating intermediate values for each node and propagating the values to child nodes based on the intermediate nodes and pertinent functions.

In step 330, the metric associated with the currently iterated node is examined. If the metric is an affected metric in respect to the PI activity, step 334 may be performed. If the metric is a non-affected metric, step 336 may be performed. The determination may be performed by a potentially improved metric determinator, such as 215 of FIG. 2.

In steps 334 and 336 a function associated with an edge is selected. The function may be a function of the potential of PI in the performance index metric based on the value of the metric.

In step 340, the value of the function selected in either step 334 or step 336 is calculated. The calculation may be based on the value of the metric associated with the iterated node.

In step 350, the value of step 340 may be multiplied with a value of a prefix of the route. In case the iterated node is the root, the multiplication may be avoided or be performed based on a prefix value of 1. The calculated value of may be utilized in a successive iteration as the prefix value.

In some exemplary embodiments, the calculated value, also referred to as an intermediate value, may be temporarily stored or retained as to avoid duplicative calculations when calculating values associated with other routes that may comprise a shared prefix with currently iterated route.

Calculations performed in steps 340-350 may be performed by an index calculator, such as 210 of FIG. 2, a route value calculator, such as 225 of FIG. 2, and the like.

In step 360, a determination may be performed whether the end of the route has been reached. By traversing over the edge, the iterated node may be updated. In case the updated iterated node is a leaf that represents a PI activity, step 370 may be performed. In case the updated iterated node represents a metric having child nodes, another iteration may be performed and step 320-360 may be performed again.

In step 370 the calculated value may be utilized. The calculated value may be outputted to a user using an output module, such as I/O module 205 of FIG. 2. A plurality of values, a suggestion based on the plurality of values, or the like, may be outputted. In some exemplary embodiments, a PI activity may be selected based on one or more calculated values. The selected PI activity may be performed and the target system may be modified accordingly. In some exemplary embodiments, after a modification of the target system is performed the method of FIG. 2 may be performed again in respect to newly obtained values of metrics in respect to the modified target system.

Referring now to FIG. 4 showing a diagram of an IPG in respect to a throughput metric, in accordance with some exemplary embodiments of the disclosed subject matter.

An IPG 400 may be utilized in computing an index of PI activities based on a throughput metric. The performance index metric may be throughput and a metric of % CPU throughput may be used. A root 410 may be associated with idleness metric which is a complementary metric of the % CPU throughput. A value of the metric of the root 410 may be referred to as X. PI activities such as represented by leaf nodes 440, 450, 460, 470 may be partitioned based on whether or not the metric of root 410 is an affected metric or a non-affected metric. The PI activities of nodes 440, 450, such as "create more threads", have a potential to improve the idleness metric. In other words, the idleness metric is an affected metric of those PI activities. For that reason, they are both reached in the IPG using edge 414 which represents affecting the metric. In a similar manner, the PI activities that do not affect the idleness metric, such as reducing spinlock problems, are reached in the IPG using edge 412.

In case the idleness metric is a non-affected metric, edge 412 may be used. Therefore the throughput may not improve based on the idleness metric. If for example, 83% idleness is measured, the potential of PI in a PI activity that will not improve the idleness metric is based on the 1-X non-idle CPU time. The function associated with the edge 412 is utilized to calculate this potential and provide for a value of 0.17. On the other hand, in case the PI activity may improve the idleness metric, an improvement may be gained in a potential of 4.88 (X divided by 1-X). $X/(1-X)$ may evaluate expected increase in the amount of work done in case of no idle time at all. As (1-X) represents current amount of work performed, $X/(1-X)$ may evaluate how many such units of work can be fitted in the current idle time in case that time is not idle any longer.

In a similar manner, node 420 which represents a metric of Cycles Per Instruction (CPI), denoted as Y, may be improved by PI activities such as reducing cache misses, and therefore are connected with an edge 424 having a function Y-1. Whereas, PI activities that may not improve the CPI metric may be connected with an edge 422 having a function 1 (i.e., a function that is not affected by the value of Y at all). Consider a CPI value of 3.11, the index value of the PI activity 470 may be 0.17*1=0.17 (the value of the prefix multiplied by the value of the value of the function of edge 422. (The index value of the PI activity 460 may be 0.17*(3.11−1)=0.36.

In a similar manner, threads per CPU metric of node 430, denoted by Z, may be improved by generating more threads, and therefore leaf node 440 is connected using edge 434. The edge 434 provides the potential of PI to the threads per CPU metric—1-Z, but in case there are more threads than CPUs no additional improvement is possible, and the value will be 0. Therefore, the function of edge 434 is MAX(1-Z,0). On the other hand, PI activities that may not improve this metric may improve the throughput equally for each thread, and therefore may the effect on the idleness should be multiplied by the value Z. Consider a Z value of 0.625. The index value of 440 may be 4.88*Max(1-0.625,0)=1.83. The index value of 450 may be 4.88*0.625=3.05.

Based on the calculated index values, it may be determined that the PI activities of nodes 450 has the most potential out of all the PI activities represented by the IPG 400, as its corresponding index value is the biggest (3.05, compared to 1.83, 0.36 and 0.17). In addition, the absolute value may provide an estimation of whether or not the PI activity should be performed. For example, reducing spinlocks provides a relatively small potential of PI in throughput (0.17). Therefore, it may be prudent to not perform this PI activity.

An absolute index value may be utilized to show how much of the throughput is affected by the problem solved by the PI activity. A relative index value (in comparison to other values of the IPG) may be utilized to determine on which problems the user's attention should be focused.

In some exemplary embodiments, the index values of the IPG 400 may be computed by propagating the index value down from the root. For example, an intermediate value for node 420 may be determined based on the prefix (i.e., 1-X). An intermediate value of 460 may be determined based on its index (i.e., the intermediate value of 420*(Y-1)). In some exemplary embodiments, additional internal nodes, such as nodes 410, 420, 430, may be used, to represent additional metrics. In some exemplary embodiments, a node in a sub-graph may represent the same metric as is represented by another node in another sub-graph. For example, in some exemplary embodiments, the nodes 420 and 430 may represent the same metric. In some exemplary embodiments, an index of a first PI activity may be calculated based on a first number of metrics, such as three metrics, whereas an index of a second PI activity may be calculated based on a second number of metrics, such as five metrics.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for determining an index of a potential of Performance Improvement (PI) in a computerized system by utilizing a PI activity, the method comprising:
    receiving a plurality of values of a plurality of performance metrics of the computerized system, the plurality of performance metrics comprises at least a performance index metric;
    determining a first portion of the plurality of performance metrics, each metric of the first portion has a potential of PI in response to performing the PI activity;
    calculating the index of the potential of PI based on at least the plurality of values of metrics associated with the first portion, wherein the index is calculated in respect to the performance index metric; and
    outputting an indication of the index of the potential of PI.

2. The method of claim 1, wherein the plurality of performance metrics are selected from a group consisting of CPU idleness, cycles per instruction and threads per CPU.

3. The method of claim 1, wherein the performance index metric is selected from the group consisting of throughput, latency and machine utilization.

4. The method of claim 1, wherein said receiving the plurality values of the plurality of performance metrics comprises utilizing a profiling tool to determine a value of a metric of the plurality of performance metrics.

5. The method of claim 1, wherein said calculating the index of the potential of PI comprises:
    retrieving an index propagation graph, the index propagation graph having a root node associated with the performance index metric, wherein the index propagation graph having a leaf node associated with the PI activity, wherein the index propagation graph having internal nodes associated with metrics comprised by the plurality of metrics; and
    calculating the index of the potential of PI based on a route in the index propagation graph.

6. The method of claim 5, wherein an edge in the index propagation graph between a source node and a target node is associated with a function based on a potential of PI in the performance index metric based on improvement of a source metric associated with the source node.

7. The method of claim 6 further comprising:
    determining a second portion of the plurality of performance metrics, a second metric of the second portion will not improve in response to performing the PI activity; and
    wherein the function is selected based on an affiliation of the source metric to the first portion or the second portion.

8. The method of claim 6, wherein said calculating the index of the potential of PI based on the route in the index propagation graph comprises:
    multiplying values of functions associated with edges of the route, wherein the values of the functions are determined based on the plurality of values.

9. The method of claim 1 further comprising calculating multiple indices of the potential of PI in respect to a plurality of PI activities; and selecting one of the plurality of PI activities based on the multiple indices.

10. The method of claim 9, wherein said selecting one of the plurality of PI activities is based on a comparison between the multiple indices.

11. The method of claim 9 further comprises performing the one of the plurality of PI activities.

12. A computerized apparatus for determining an index of a potential of PI in a computerized system by utilizing a PI activity, the computerized apparatus having a processor, the computerized apparatus comprising:
    a receiver configured to receive a plurality of values of a plurality of performance metrics of the computerized system, the plurality of performance metrics comprises at least a performance index metric;
    an index calculator configured to calculate the index of the potential of improvement in respect to the performance index metric, said index calculator comprising:
    a potentially improved metric determinator configured to determine a first portion of the plurality of performance metrics, each metric of the first portion has a potential of improvement in response to the PI activity; and
    an output module configured to output an indication of the index of the potential of PI.

13. The computerized apparatus of claim 12, wherein said receiver is configured to utilize a profiling tool; the profiling tool is operative to determine a value of a metric of the plurality of performance metrics.

14. The computerized apparatus of claim 12, wherein said index calculator further comprising:
    an index propagation graph module; the index propagation graph module is configured to retain an index propagation graph, wherein the index propagation graph having a root node associated with the performance index metric, wherein the index propagation graph having a leaf node associated with the PI activity, wherein the index propagation graph having internal nodes associated with metrics comprised by the plurality of metrics; and
    a route value calculator configured to calculate the index of the potential of PI based on a route in the index propagation graph retained by said index propagation graph module.

15. The computerized apparatus of claim 14 wherein said route value calculator is configured to calculate the index by multiplying values of functions associated with edges of the route, wherein the values of the functions are determined based on the plurality of values.

16. The computerized apparatus of claim 12 wherein said output module is configured to provide indications of indices of the potential of improvement based on multiple PI activities.

17. A computer program product for determining an index of a potential of Performance Improvement (PI) in a computerized system by utilizing a PI activity, the product comprising:
- a non-transitory computer readable medium including computer instructions stored therein for causing a computer processor to perform;
- a first program instruction for receiving a plurality of values of a plurality of performance metrics of the computerized system, the plurality of performance metrics comprises at least a performance index metric;
- a second program instruction for determining a first portion of the plurality of performance metrics, each metric of the first portion has a potential of PI in response to performing the PI activity;
- a third program instruction for calculating the index of the potential of PI based on at least the plurality of values of metrics associated with the first portion, wherein the index is calculated in respect to the performance index metric; and
- a fourth program instruction for outputting an indication of the index of the potential of PI;
- wherein said first, second, third, and fourth program instructions are stored on said computer readable medium.

18. The computer program product of claim 17 wherein the plurality of performance metrics are selected from a group consisting of CPU idleness, cycles per instruction and threads per CPU.

19. The computer program product of claim 17 wherein the performance index metric is selected from the group consisting of throughput, latency and machine utilization.

20. The computer program product of claim 17 wherein said receiving the plurality values of the plurality of performance metrics comprises utilizing a profiling tool to determine a value of a metric of the plurality of performance metrics.

* * * * *